June 27, 1961 M. F. ROYSTON 2,990,126
FILM SUPPLYING APPARATUS
Filed Oct. 9, 1958 3 Sheets-Sheet 1

INVENTOR.
Marvin F. Royston
BY Robert F. Miehle Jr.
Att'y

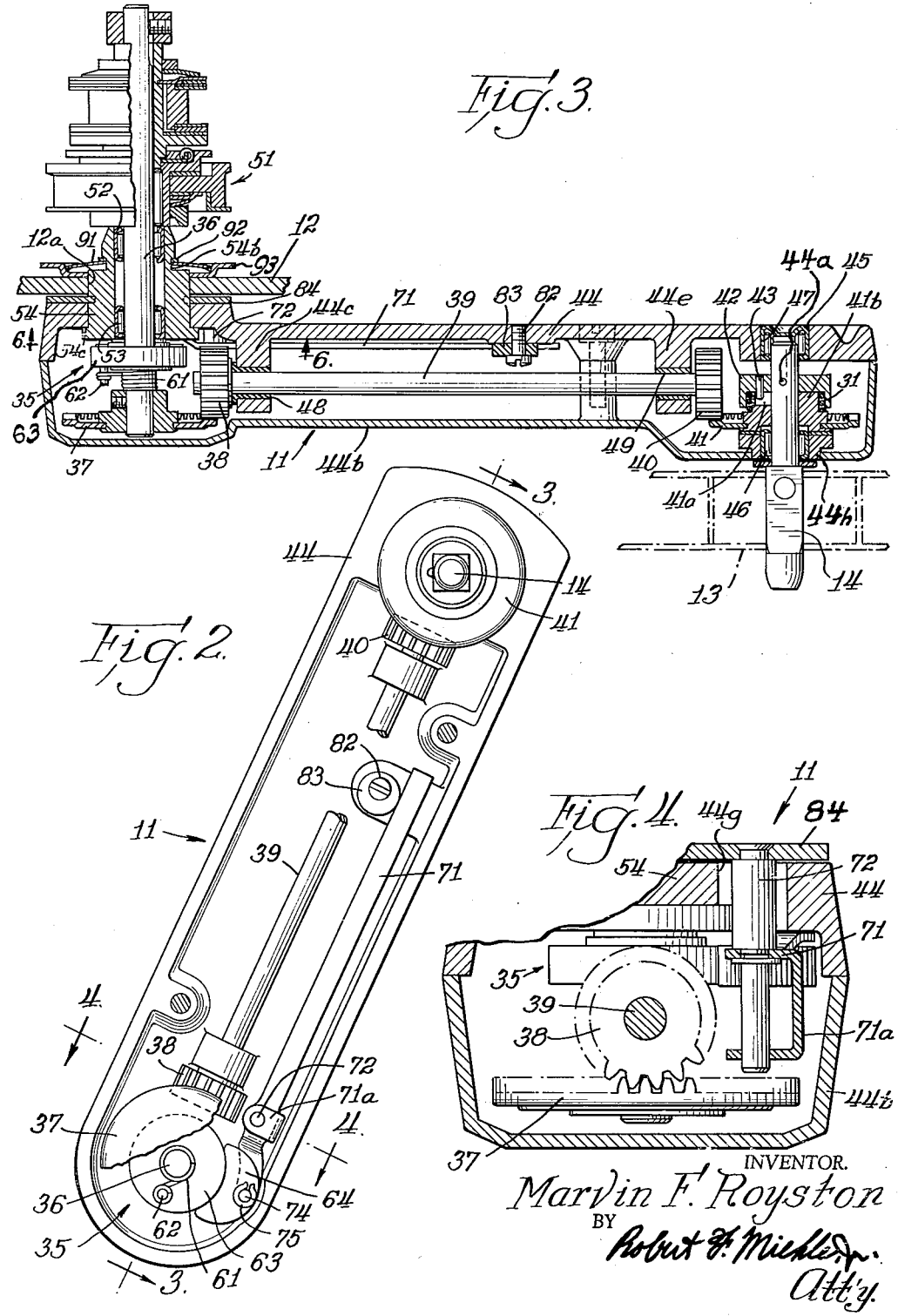

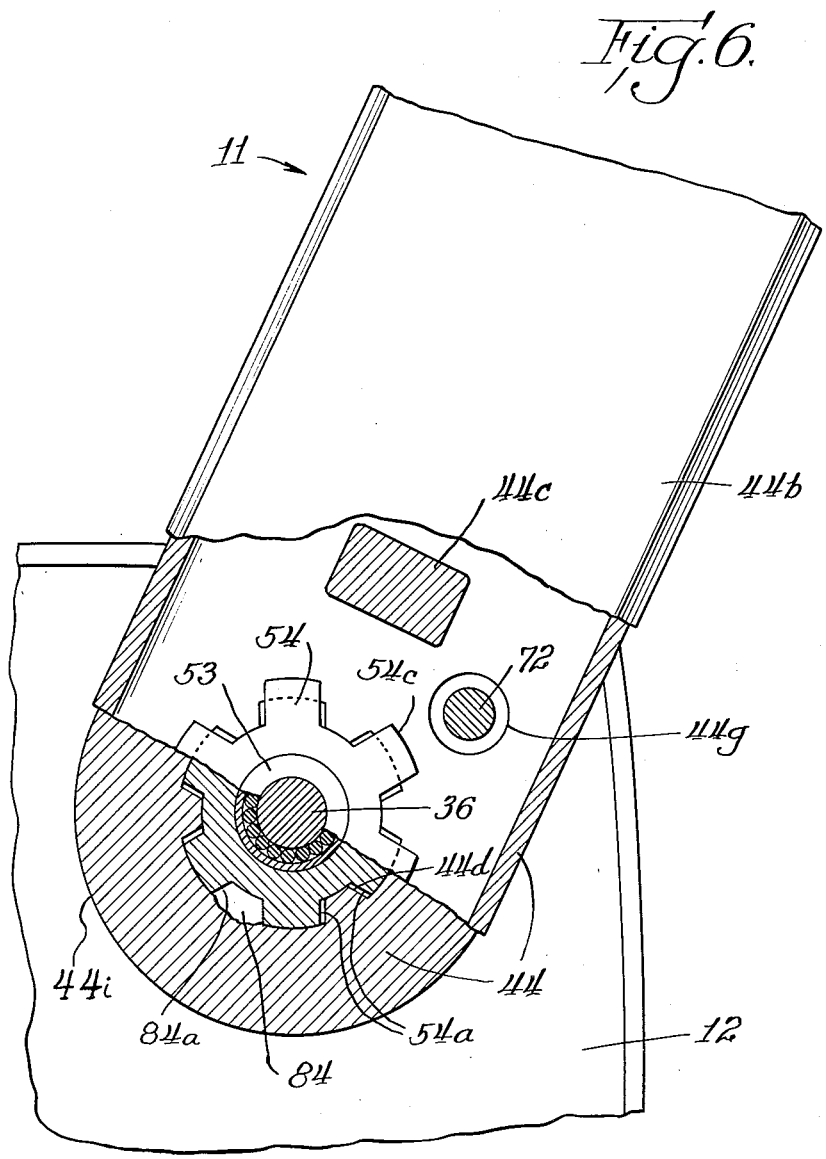

United States Patent Office

2,990,126
Patented June 27, 1961

2,990,126
FILM SUPPLYING APPARATUS
Marvin F. Royston, Skokie, Ill., assignor to Bell & Howell Company, Chicago, Ill., a corporation of Illinois
Filed Oct. 9, 1958, Ser. No. 766,232
9 Claims. (Cl. 242—55.12)

This invention relates to a film supplying apparatus, and more particularly to a supply reel controlling device for preventing slack from overrunning of a movie projector supply reel when feed of the film is stopped.

An object of the invention is to provide a rotatable strand supply reel which may be stopped quickly without overrunning effects.

Another object of the invention is to provide a movie projector having a film supply reel and film sprockets which may be quickly stopped together with means for braking the supply reel to limit overrun of the reel and means for rewinding any slack film from the slight overrun of the supply reel.

Another object of the invention is to provide a movie projector having a supply reel mounted on a spindle carried by an arm pivotally mounted on the projector along with a one-way clutch actuated brake for minimizing overrun of the reel when tension on film being taken from the reel is removed and a resilient connection between the spindle and the reel to rewind any slack film on the supply reel.

A complete understanding of the invention may be obtained from the following detailed description of a film supplying apparatus forming a specific embodiment thereof, when read in conjunction with the appended drawings, in which:

FIGURE 2 is an enlarged front elevational view with portions broken away of the film supplying apparatus;

FIGURE 3 is a sectional view taken along line 3—3 of FIGURE 2;

FIGURE 4 is an enlarged sectional view taken along line 4—4 of FIGURE 2;

FIGURE 6 is a vertical sectional view taken along line 6—6 of FIGURE 3.

The invention provides a film supplying apparatus for a movie projector in which a braking force proportional to the weight of a supply reel is applied to the supply reel to prevent overrunning of the supply reel during running of the projector, and maintain uniform tension on the film. To prevent overtensioning of the film, the braking force must be less than that required to stop the reel when the projector is stopped suddenly, and a slight overrunning of the supply reel may occur when the projector is so stopped. To take up any slack from such slight overrunning, a resilient connection may be provided between the supply reel and the braking means to rewind any film unwound by the overrun of the supply reel, the braking means being sufficient to cause the resilient connection to retension the film.

The force from the braking means may be transmitted to the supply reel through an overrunning clutch so that, when the supply reel is driven in its reverse or rewinding direction, the braking means is entirely disconnected from the supply reel.

Figure 1:
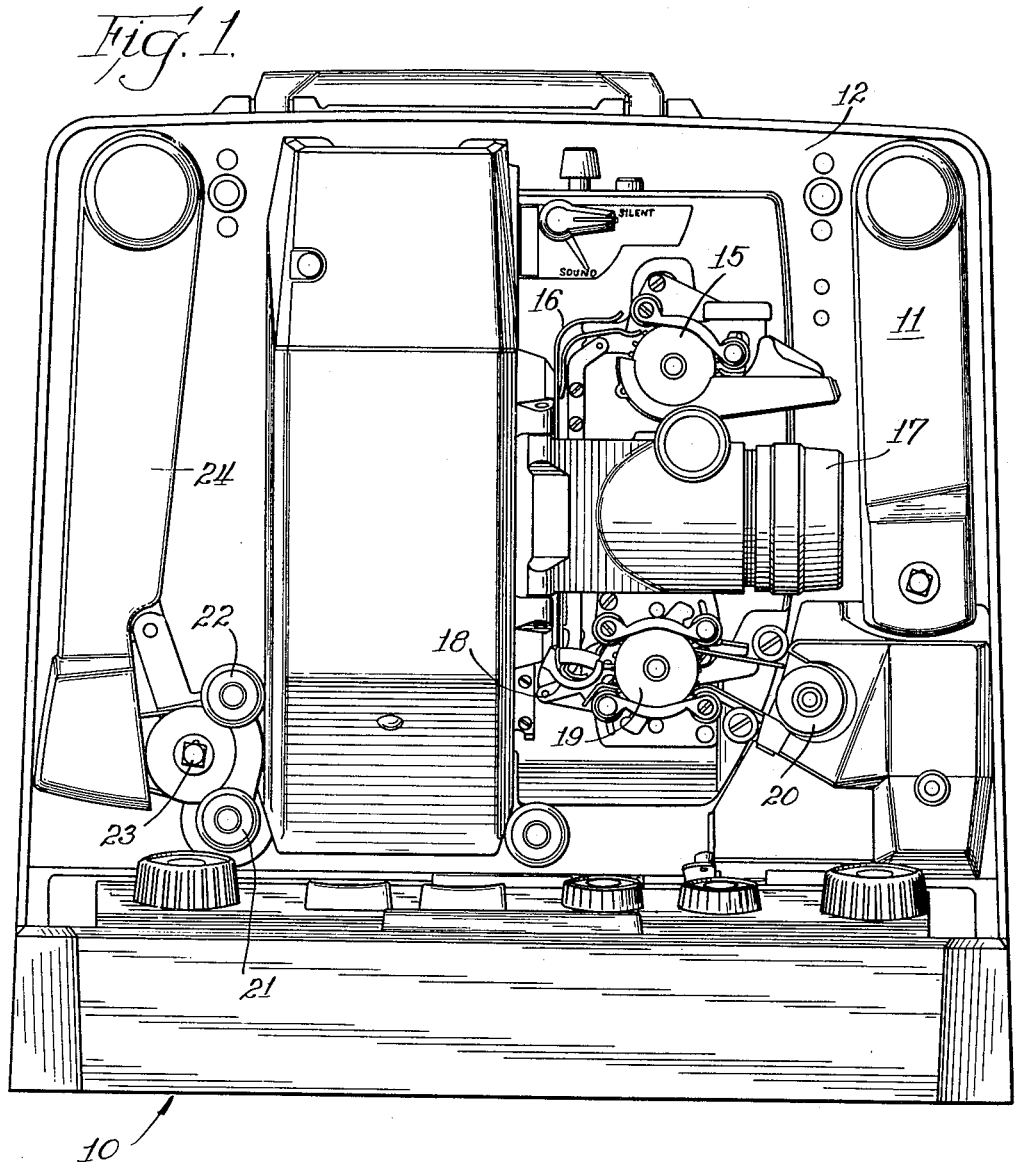
FIGURE 1 is a front elevational view of a movie projector having a film supplying apparatus forming one embodiment of the invention.
Figure 5:
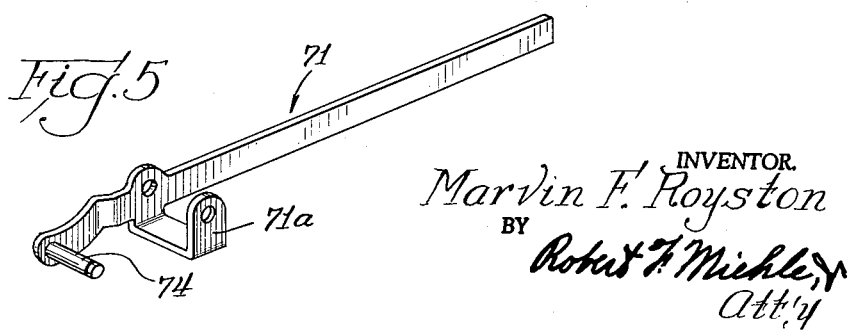
FIGURE 5 is an enlarged perspective view of a brake actuating lever of the film supplying apparatus.

Referring now in detail to the drawings, there is shown in FIGURE 1, a moving picture projector 10 having a supply reel arm mechanism 11 mounted pivotally on vertical frame plate 12 between a storage position in which the arm mechanism is shown in FIGURE 1 and an operative position in which it is shown in FIGURE 2. In the latter position, the arm mechanism 11 is adapted to mount a film supply reel 13 (FIGURE 3) on a spindle 14 thereof in keyed relationship to selectively supply film while the projector is operated to show pictures and rewind or reverse the film. When the projector is operated to show the film, the film travels sequentially from the supply reel to a driven feed sprocket 15 (FIGURE 1) which advances the film from the supply reel toward a loop-former 16. The film is fed intermittently by a shuttle (not shown) downwardly from the loop former 16 between a projector lens system 17 and an illuminating device (not shown) past a loop-former 18 to a second driven feed sprocket 19. The film is advanced by the sprocket 19 and travels around a sound drum 20 and guide rolls 21 and 22 to a takeup reel (not shown) mounted on and keyed to a driven spindle 23 of a takeup reel arm mechanism 24. The mechanism 24 is pivoted about its upper end from its folded storage position shown in FIGURE 1 to an operative position in which the spindle 23 is positioned above and to the left of the projector.

When the projector is operated to show moving pictures, the sprocket 15 positively advances the film from the supply reel 13 (FIGURE 3) and the reel 13 is driven only by the tension on the film being advanced by the sprocket 15. The projector in addition to showing moving pictures may be actuated for animation during which single frames of the film are shown. During animation, the sprocket 15 advances the film exactly one frame to the left as viewed in FIGURE 1 and then stops rapidly, after which the cycle is repeated. It will be apparent that during animation, the intermittent pulls on the portion of the film between the sprocket 15 and the supply reel, the supply reel must be braked to prevent overrunning from its momentum which overrunning, if restrained, would cause slack in the film to form between the sprocket 15 and the supply reel to such an extent as to fall in a loop in front of the lens system 17 and interfere with the projection of the picture.

The braking force required to prevent overrunning of the supply reel 13 during normal or movie operation of the projector is much less than that required when the sprocket 19 is stopped which is effected suddenly. Undesirably high tensions on the film would be created if the braking force on the reel were made great enough to prevent any overrunning of the supply reel when the sprocket is stopped. To keep the normal running tension on the film at a minimum and yet prevent any slack between the supply reel and sprocket 19 when the sprocket is stopped, the braking force is applied through a torsion spring 31 (FIGURE 3) which takes up slack in the film by turning the reel 13 in a rewinding direction after the reel has overrun slightly when the sprocket 15 is stopped. The resilient connection effected by the spring 31 also provides a cushioning action at the start of rewinding where the reel is driven.

The braking force is applied to the spindle 14, to which the supply reel 13 is keyed, by a brake 35 through a rewind drive shaft 36, gears 37 and 38, a spindle drive shaft 39, gears 40 and 41, the coiled spring 31 and a cupped disc 42 fixed rigidly by a pin 44a to the spindle 14. The gears 37 and 38 and 40 are fixed to the shafts 36 and 39, respectively, against rotation relative thereto, while the gear 41 is freely rotatable on the spindle 14, the connection therebetween being the spring 31 which has one end fixed to the disc 42 and the other end fixed to the gear 41. Rotation of the gear 41 on the spindle 14 is limited by a pin 43 fixed to the disc 42 and projecting into a slot 41a in hub 41b of the gear 41. This pin and slot connection permits free rotation between the gear 41 and the spindle 14 of about sixty degrees of revolution.

The spindle 14 is mounted rotatably on arm casing 44 by needle bearings 45 and 46, the bearing 45 being press fit mounted in bore 47 and bearing 46 being mounted in a bracket portion 44h of casing 44. The casing 44 is longitudinally split and includes a removable cover 44b. The casing 44 has aligned bearing supports 44c and 44e supporting bushings 48 and 49 journalling the shaft 39.

To drive the supply spool in the rewinding direction, the drive shaft 36 is driven by motor means (not shown) in the projector through a manually actuable clutch mechanism 51 in a direction opposite to that in which the shaft 36 is driven by rotation of the reel 13 during unwinding. During rewinding, the clutch 51 connects the shaft 36 to driving means of the projector. Also, in rewinding, the pin 43 engages one wall of the slot 41a in disc 41 to positively drive the reel from the shaft 36. The shaft 36 is mounted in bearings 52 and 53 mounted in externally splined bushing 54 rotatably mounted in bore 12a in frame plate 12.

When film is unwound from reel 13, the clutch 51 is set in a condition disconnected from the shaft 36, and braking force is applied to the shaft 36 by a one-way or overrunning clutch spring 61 coiled closely on shaft 36. The spring is secured at one end to pin 62 fixed to brake disc 63, and a brake shoe 64 bears against the periphery of the disc 63 to frictionally retard its rotation. When film is unwound from the reel 13, the reel rotates the shaft 36 in a counter-clockwise direction, as viewed in FIGURE 2, which tightens the clutch spring 61 on the shaft 36 to lock the disc 63 to the shaft 36 for rotation therewith. Thus, braking force from the shoe 64 is transmitted to the shaft 36 directly. During reverse or rewinding operation of the projector, the shaft 36 is driven in a clockwise direction which uncoils and loosens the spring 61 thereon so that the spring 61 and disc 63 are not driven by the shaft 36 and braking force is not applied to the shaft 36 during such rewinding or reverse operation.

During unwinding, to make the tension on the film from the reel 13 uniform during conditions varying from a full reel to an empty reel, the braking force applied to the spindle 14 is decreased as the amount of film on the reel decreases. This is accomplished by making the braking force dependent on the weight of the film on the reel and therefore dependent on the diameter of the film on the reel. The braking force is proportional to the pressure of the shoe 64 on the disc 63 which is controlled by a lever 71. The lever 71 is pivotally mounted by a bracket portion 71a on a pin 72 riveted to a mounting plate 84. The arm casing 44 has a clearance slot 44g (FIGURE 4) to permit unrestrained relative movement between the casing 44 and the pin 72. The brake shoe is pivotally mounted on a pin 74 fixed to the lever. A spring clip 75 retains the shoe on the pin 74.

The arm casing 44 exerts force on the lever 71 through an adjustable eccentric cam 83 (FIGURES 2 and 3) fixed in adjusted position to the casing 44 by screw 82. The pin 72 mounting the lever 71 pivotally is held in a fixed position relative to the plate 12 while limited pivotal movement of the casing 44 and the elements carried thereby is permitted relative to the plate 12. Hence, the weight of the film on the reel bears against the lever 71 when the arm mechanism 11 is in its operating position in which it extends at an appreciable angle relative to the vertical, this position being illustrated in FIGURE 2. The relative movement between the casing 44 and the lever 71 is made possible by mounting the pin 72 on the plate 84 fixed rigidly to the bushing 54 while splining the arm casing 44 sufficiently loosely to the bushing to permit the casing to be held against rotation only by the reactive force of the lever 71 on the cam 83. Spline ribs 44d are formed in a hub portion 44i of the lever and fit loosely in between spline ribs 54a of the bushing 54. The disc 84 has spline ribs 84a fitting closely between the ribs 54a of the bushing.

The bushing is mounted on the plate 12 against axial movement in the bore 12a by a peripherally notched index disc 93 (FIGURE 3), a spring washer 91, and a C-shaped retaining ring 92 snapped into groove 54b. The disc 93 is rigidly splined to the bushing 54. Retaining collar or flange segments 54c on bushing 54 prevents movement of the casing 44 downwardly, as viewed in FIGURE 3, relative to the bushing 54. Manually operable latch means (not shown) are provided on the frame plate 12 for releasably locking the index disc 93 against rotation relative to the frame plate 12, and the index disc is closely splined to the bushing 54 to lock the bushing 54 against rotation relative to the plate 12. The index disc has one peripheral notch (not shown) engageable by the latching means to hold the arm mechanism 11 in its retracted or storage position as shown in FIGURE 1 and a second peripheral notch engageable by the latch means to locate the arm mechanism 11 in its operative position shown in FIGURE 2.

When the projector is operated to project pictures, the sprocket 15 pulls the film from the reel 13. This turns the reel and the spindle 14 in a direction such as to wind up the spring 31 until the pin 43 engages the wall of the slot 41a, and then the gear 41 is rotated with the spindle and reel. The clutch and brake mechanism 35 is strong enough to prevent rotation of the gear 41 and shafts 39 and 36 by only the force of the coiling of the spring 31. The mechanism 35 retards the rotation of the spindle substantially proportionally to the amount of film on the reel 13 so that substantially uniform tension is applied to the film. This braking force is sufficient to prevent overrunning of the reel 13 while the sprocket 15 is driven. However, to avoid overtensioning the film, the braking force is kept below that which would be required to prevent any overrunning of the reel 13 when the sprocket 15 is stopped which stopping is effected instantaneously. Consequently, when the sprocket 15 is stopped, the reel 13 overruns slightly and slack in the film is created between the reel 13 and sprocket 15. However, this slack is immediately removed by the action of the spring 31, which in uncoiling turns the reel 13 in a rewinding direction until the film is tensioned. The force exerted by the brake mechanism 35 is stronger than the torsional force of the spring 31, and this causes the spring 31 to uncoil when there is slack in the film. By this structure, the normal running tension on the film is kept less than that tension which might break the film. The spring 31 also has a cushioning effect when the sprocket 15 starts to advance film from the reel 13 since the reel 13 and spindle 14 are started before the braked shafts 36 and 39 and gearing. The spring 61 grips the shaft 36 only during unwinding of film from the reel, and during rewinding exerts no braking force on the shaft 36.

The function of the adjustable cam 81 is, when the casing is in its operative position, to keep the casing splining ribs 44d out of contact with the ribs 54a of the bushing 54 so that the gravitational force of the casing 44 and reel 13 tending to pivot the casing 44 about the bushing 54 is restrained only by the lever 71. By this construction the effect of the weight of the reel on the braking force is undiminished by external factors.

While the invention is thus described, it is not wished to be limited to the precise details described, as changes may be readily made without departing from the spirit of the invention.

What is claimed is:

1. In a film supplying apparatus, a supply reel, means mounting the supply reel for rotation by film pulled therefrom, braking means for supplying to the reel a braking force sufficiently large to prevent overrunning of the reel while film is pulled continuously therefrom and not sufficiently large to prevent overrunning of the reel when pull on the film is stopped suddenly, and means for turning the reel in a rewinding direction when the pull on the film is stopped suddenly, the means for turning the reel including a coilable spring connecting the braking means to the reel, the spring being of a strength insufficient to prevent coiling thereof when the film is pulled from the reel and sufficient to turn the film in a rewinding direction when the reel is stopped and there is slack in the film.

2. The apparatus defined by claim 1 in which means are provided for limiting coiling of the spring from pull on the film.

3. In a motion picture projector, a supply reel, a spindle keyed to the reel for mounting the supply reel for rotation, driving means for selectively rotating the spindle in a rewinding direction and permitting free rotation of the spindle when film is unwound from the reel, the driving means including a shaft for transmitting driving force to the spindle during rewinding and rotated by the spindle during unwinding, and brake means including one-way clutch means restraining rotation of the spindle in the direction unwinding film and permitting free rotation of the spindle in the rewinding direction, the clutch means including a spring coiled on the shaft in a direction in which the spring grips the shaft when the shaft is rotated by the spindle and does not grip the shaft when the spindle is rotated by the shaft.

4. The projector defined by claim 3, in which the brake means includes a brake member mounted rotatably on the shaft and fixed to one end of the coiled spring and a brake shoe restraining rotation of the brake member.

5. The projector defined by claim 3, in which there is provided lost motion connecting means between the driving means and the spindle, and spring means associated with the lost motion connecting means and resiliently connecting the driving means and the spindle for turning the spindle in a recoiling direction when uncoiling rotation of the driving means is stopped.

6. In a projector, a frame, an arm member, index means mounting one end of the arm for limited pivotal movement of the arm member relative to the index means and mounted on the frame, a spindle carried by the other end of the arm member, adjustable brake means for restraining rotation of the spindle, and lever means supported by the index means for supporting the arm member in a non-vertical position and adjusting the brake means in accordance with the force required to support the arm member.

7. In a projector, a vertical frame plate having a hole therethrough, a bushing having external spline ribs rotatable in the hole, a mounting disc fixed rigidly to the bushing, an arm-like casing loosely splined at one end to the bushing for limited rotation relative to the bushing in a position in which the casing extends in a non-vertical direction, a spindle mounted rotatably on the other end of the casing, a shaft mounted rotatably in the bushing, means drivingly connecting the shaft and the spindle, a brake disc in the casing and mounted rotatably on the shaft, a coiled spring on the shaft and connected at one end of the spring to the brake disc for connecting the disc to the shaft when the shaft is rotated in a direction tending to coil the spring, a brake shoe engaging the periphery of the brake disc, a brake lever supporting the brake shoe and pivotally mounted on the mounting disc, means resting on the lever for supporting the casing in a non-vertical position in which the gravitational force tending to turn the casing presses the lever in a direction pressing the brake shoe against the brake disc.

8. The projector defined by claim 7, in which there is provided a resilient connection between the shaft and the spindle.

9. The projector defined by claim 7, in which there is provided a drive disc keyed to the spindle, a gear rotatably mounted on the spindle, a torsion spring connecting the drive disc and the gear, and transmission means carried by the casing drivingly connecting the shaft and the gear.

References Cited in the file of this patent

UNITED STATES PATENTS

| | | |
|---|---|---|
| 636,732 | Larzelere | Nov. 7, 1899 |
| 726,101 | Reich et al. | Apr. 21, 1903 |
| 877,232 | Rolland | Jan. 21, 1908 |
| 1,257,874 | Jordan | Feb. 26, 1918 |
| 1,527,548 | Hall | Feb. 24, 1925 |
| 2,313,662 | Morgan et al. | Mar. 9, 1943 |
| 2,718,361 | Evraets | Sept. 20, 1955 |

FOREIGN PATENTS

| | | |
|---|---|---|
| 775,517 | France | Oct. 15, 1934 |